(12) United States Patent
Yan et al.

(10) Patent No.: US 9,998,440 B2
(45) Date of Patent: Jun. 12, 2018

(54) SYSTEM AND PROCESSING METHOD FOR ELECTRONIC AUTHENTICATION CLIENT, AND SYSTEM AND METHOD FOR ELECTRONIC AUTHENTICATION

(71) Applicant: Tencent Technology (Shenzhen) Company Limited, Guangdong (CN)

(72) Inventors: Yu Yan, Guangdong (CN); Dazhi Yang, Guangdong (CN); Wen Zhang, Guangdong (CN); Bin Ma, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 123 days.

(21) Appl. No.: 14/484,644

(22) Filed: Sep. 12, 2014

(65) Prior Publication Data

US 2015/0074760 A1 Mar. 12, 2015

Related U.S. Application Data

(63) Continuation of application No. PCT/CN2013/076818, filed on Jun. 5, 2013.

(30) Foreign Application Priority Data

Jun. 5, 2012 (CN) .......................... 2012 1 0182960

(51) Int. Cl.
*G06F 7/04* (2006.01)
*H04L 29/06* (2006.01)
(Continued)

(52) U.S. Cl.
CPC .......... *H04L 63/08* (2013.01); *H04L 63/0853* (2013.01); *H04N 21/25816* (2013.01); *H04N 21/42204* (2013.01); *H04W 12/06* (2013.01)

(58) Field of Classification Search
CPC ................ H04L 63/08; H04L 63/0853; H04N 21/25816; H04N 21/42204; H04W 12/06
(Continued)

(56) References Cited

U.S. PATENT DOCUMENTS 5,481,611 A * 1/1996 Owens .................. H04W 12/06
713/159
6,772,331 B1 * 8/2004 Hind ...................... G06F 21/445
370/313

(Continued)

FOREIGN PATENT DOCUMENTS

CN 101137040 A 3/2008
CN 101242482 A 8/2008
(Continued)

OTHER PUBLICATIONS

Written Opinion, PCT, International Search Report.
(Continued)

*Primary Examiner* — Alexander Lagor
*Assistant Examiner* — Abdullah Almamun
(74) *Attorney, Agent, or Firm* — Anova Law Group, PLLC

(57) ABSTRACT

A system for an electronic authentication client and a processing method thereof, and a system for electronic authentication and a method thereof are disclosed. The system for the electronic authentication client includes an intelligence remote controller and a television controller, wherein the television controller is configured to receive data of an authentication code from an authentication server, send the data of the authentication code to the intelligence remote controller, receive an operation result of an authentication code from the intelligence remote controller, and send the operation result of the authentication code to the authentication server; and the intelligence remote controller (Continued)

is configured to receive the data of the authentication code from the television controller, operate on the data of the authentication code based on a built-in authentication algorithm to obtain the operation result of the authentication code, and send the operation result of the authentication code to the television controller.

9 Claims, 4 Drawing Sheets

(51) Int. Cl.
  *H04W 12/06* (2009.01)
  *H04N 21/422* (2011.01)
  *H04N 21/258* (2011.01)
(58) Field of Classification Search
  USPC .......................................................... 726/3
  See application file for complete search history.

(56) References Cited

U.S. PATENT DOCUMENTS

| | | | | |
|---|---|---|---|---|
| 7,021,534 | B1* | 4/2006 | Kiliccote | G06F 21/606 235/380 |
| 7,578,436 | B1* | 8/2009 | Kiliccote | G06F 21/606 235/375 |
| 7,650,361 | B1 | 1/2010 | Wong et al. | |
| 7,734,527 | B2* | 6/2010 | Uzo | G06Q 20/06 235/383 |
| 8,347,374 | B2* | 1/2013 | Schneider | G06F 21/305 726/12 |
| 8,510,798 | B2* | 8/2013 | Candelore | H04N 7/163 380/241 |
| 8,589,437 | B1* | 11/2013 | Khomenko | G06F 19/28 707/770 |
| 8,738,907 | B2* | 5/2014 | French | H04L 63/062 713/168 |
| 9,083,680 | B2* | 7/2015 | Marsico | H04L 63/0428 |
| 2003/0005446 | A1* | 1/2003 | Jaff | H04N 7/17318 725/51 |
| 2004/0257998 | A1* | 12/2004 | Chu | H04L 41/00 370/252 |
| 2005/0272405 | A1* | 12/2005 | Tomlinson | H04N 7/163 455/404.2 |
| 2006/0137015 | A1* | 6/2006 | Fahrny | H04N 7/17318 726/26 |
| 2006/0155653 | A1* | 7/2006 | Persokrud | G06Q 20/123 705/67 |
| 2006/0184807 | A1* | 8/2006 | Kocher | G06F 21/10 713/194 |
| 2006/0256370 | A1* | 11/2006 | Murakawa | G06F 21/31 358/1.15 |
| 2008/0010686 | A1* | 1/2008 | Nemoto | G06F 12/1491 726/27 |
| 2008/0126797 | A1* | 5/2008 | Kim | H04L 9/3263 713/155 |
| 2008/0238709 | A1* | 10/2008 | Vaziri | H04N 5/4403 340/4.32 |
| 2009/0037748 | A1* | 2/2009 | Kim | G06F 21/10 713/193 |
| 2009/0172411 | A1* | 7/2009 | Kershaw | G06F 21/53 713/189 |
| 2009/0232308 | A1* | 9/2009 | Candelore | H04L 9/3247 380/270 |
| 2009/0328092 | A1* | 12/2009 | Goeman | H04N 7/165 725/25 |
| 2011/0107378 | A1* | 5/2011 | Kooman | H04N 21/25866 725/87 |
| 2011/0167444 | A1* | 7/2011 | Sun | H04N 7/17318 725/31 |
| 2011/0271296 | A1* | 11/2011 | Tu | H04N 5/44543 725/25 |
| 2013/0007351 | A1* | 1/2013 | Numano | H04N 7/141 711/103 |
| 2013/0290719 | A1* | 10/2013 | Kaler | G06F 21/41 713/168 |

FOREIGN PATENT DOCUMENTS

| | | | | |
|---|---|---|---|---|
| CN | 101489054 | A | | 7/2009 |
| CN | 101541002 | A | | 9/2009 |
| CN | 101742056 | A | | 6/2010 |
| CN | 101902325 | A | | 12/2010 |
| CN | 101137040 | B | * 1/2012 | ............... H04L 9/32 |
| CN | 202210323 | U | | 5/2012 |
| WO | WO 2013/182058 | A1 | | 12/2013 |

OTHER PUBLICATIONS

Search Report & First Office Action for Priority Chinese Patent Application No. 201210182960.5, dated Nov. 4, 2015; 5 pgs.
Supplementary Search Report & Second Office Action for Priority Chinese Patent Application No. 201210182960.5, dated Mar. 21, 2016; 7 pages.
Office Action for Parallel Korean Patent Application No. 10-2014-7034444, dated Mar. 8, 2016; 5 pgs.
Xu Feng, Web 3.0 Password Protection Management Strategy, Computer Security, pp. 33-35, Jul. 15, 2011; 4 pages.

* cited by examiner

SYSTEM AND PROCESSING METHOD FOR ELECTRONIC AUTHENTICATION CLIENT, AND SYSTEM AND METHOD FOR ELECTRONIC AUTHENTICATION

CROSS REFERENCE TO RELATED APPLICATIONS

This application is a continuation application of International Application No. PCT/CN2013/076818, filed Jun. 5, 2013, which claims priority of Chinese patent application No. CN201210182960.5, filed Jun. 5, 2012, the contents of which are incorporated herein by reference in their entirety.

FIELD

The present disclosure relates generally to the technology field of electronic authentication, and more particularly, to a system for an electronic authentication client, a processing method for the electronic authentication client, a system for electronic authentication and a method for electronic authentication.

BACKGROUND

With the development of network technology, there are a growing number of applications to be subject to electronic authentication, such as logging into private accounts, electronic payment or the like. Because the application to be subject to electronic authentication often involves information relating to personal privacy or individual interest, security is most important to the electronic authentication and the accuracy of the electronic authentication should be ensured by various means. A frequently used approach in the prior electronic authentication technology is sending an authentication code from a server, performing a client operation on the authentication code based on a conventional authentication algorithm, and the operation result of the authentication code can be achieved and returned to the authentication server to allow the server to determine whether the authentication is valid, according to the operation result of the authentication code.

A USB key is used to execute the operation on the authentication code sent from the authentication server to obtain the operation result of the authentication code in the current electronic authentication client. Generally, a pre-programmed authentication algorithm is stored in the USB key, which is programmed in a hardware chip of the USB key and not readable from outside. The operation on the authentication code can only be achieved by using a program to access a USB interface of the USB key for data interaction. The USB key used in an e-bank online payment is a popular electronic authentication method for instance, which can improve the security of e-commerce. In this case, an electronic authentication client consists of the USB key and the processing apparatus fitted with an access program, such as computer.

However, with the advent of smart televisions or smart set-top boxes, web browsing can be achieved via a television, and thus there is the potential for achieving electronic authentication via television equipment. For instance, when implementing electronic business with television equipment, an authentication for electronic identities of the deal is also needed.

However the data processing of the electronic authentication client cannot be implemented reasonably in this case. If the authentication code from the authentication server is calculated by using a USB key in the client to obtain the operation result of the authentication code, then the USB key needs to be inserted into and removed from the smart television or the smart set-top box on the client side every time, and the smart television or the smart set-top box is required to be provided with a USB interface for the USB key, so it is not convenient to use.

SUMMARY OF THE INVENTION

According to one aspect of the disclosure, in order to solve the problem that the USB key is not convenient to process data in the client when performing electronic authentication in the television equipment, the present disclosure provides a system for an electronic authentication client without plugging a USB key or requiring a USB interface for client data transmission, and a processing method for the electronic authentication client thereof.

Described herein is a system for an electronic authentication client, including an intelligence remote controller and a television controller, wherein:

the television controller is configured to receive data of an authentication code from an authentication server, send the data of the authentication code to the intelligence remote controller, receive an operation result of an authentication code from the intelligence remote controller, and send the operation result of the authentication code to the authentication server; and the intelligence remote controller is configured to receive the data of the authentication code from the television controller, operate on the data of the authentication code based on a built-in authentication algorithm to obtain the operation result of the authentication code, and send the operation result of the authentication code to the television controller.

Also described herein is a processing method for electronic authentication client, including:

receiving, by a television controller, data of an authentication code from an authentication server, and sending the data to an intelligence remote controller;

receiving, by the intelligence remote controller, the data of the authentication code from the television controller, operating on the data of the authentication code based on a built-in authentication algorithm to obtain the operation result of the authentication code, and sending the operation result of the authentication code to the authentication server; and receiving, by the television controller, the operation result of the authentication code from the intelligence remote controller, and sending the operation result of the authentication code to the authentication server.

The system for the electronic authentication client and the processing method for the electronic authentication client of the present disclosure interact with the data by using of an intelligence remote controller and a television controller, such as a set-top box or the like, to implement electronic authentication, and it does not require set up of a data transmission interface, such as USB or the like, and does not require plug-in of a USB key, due to implementing the authentication algorithm in the intelligence remote controller, which provides convenience. The television controller sends the data of the authentication code from the authentication server, the intelligence remote controller operates on the data of the authentication code using a built-in unreadable authentication algorithm, and the operation result of the authentication code is sent to the authentication server via the data interaction between the intelligence remote controller and the television controller, thus ensuring the authentication algorithm is unreadable and the electronic authentication is secure.

According to another aspect of the disclosure, in order to solve the problem that the USB key is not convenient to process data in the client when making electronic authentication in the television equipment in the background art, the present disclosure also provides a system for electronic authentication without plugging a USB key or requiring a USB interface for client data interaction, and a method for electronic authentication thereof.

Described herein is a system for electronic authentication, including a authentication server, an intelligence remote controller and a television controller, wherein:

the authentication server is operable to send data of an authentication code based on an authentication request, receive an operation result of an authentication code, and determine whether the authentication is valid based on the operation result of the authentication code;

the television controller is operable to receive the data of the authentication code from the authentication server, send the data of the authentication code to the intelligence remote controller, receive the operation result of the authentication code from the intelligence remote controller, and send the operation result of the authentication code to the authentication server; and the intelligence remote controller is configured to receive the data of the authentication code from the television controller, operate on the data of the authentication code based on a built-in authentication algorithm to obtain the operation result of the authentication code, and send the operation result of the authentication code to the television controller.

Also described herein is a method for electronic authentication, including:

generating, by an authentication server, data of an authentication code according to an authentication request, and passing the data of the authentication code to a television controller;

receiving, by a television controller, the data of an authentication code from the authentication server, and sending the data to an intelligence remote controller;

receiving, by the intelligence remote controller, the data of the authentication code from the television controller, operating on the data of the authentication code based on a built-in authentication algorithm to obtain the operation result of the authentication code, and sending the operation result of the authentication code to the authentication server;

receiving, by the television controller, the operation result of the authentication code from the intelligence remote controller, and sending the operation result of the authentication code to the authentication server; and receiving, by the authentication server the operation result of the authentication code from the television controller, and determining whether the authentication is valid based on the operation result of the authentication code.

The system for electronic authentication and the method for electronic authentication of the present disclosure interact with the data by using of an intelligence remote controller and a television controller, such as a set-top box or the like, to implement electronic authentication, and it does not require set up of a data transmission interface, such as USB or the like, and does not require plug-in of a USB key, due to implementing the authentication algorithm in the intelligence remote controller, which provides convenience. The television controller sends the data of the authentication code from the authentication server, the intelligence remote controller operates on the data of the authentication code using a built-in unreadable authentication algorithm, the operation result of the authentication code is sent to the authentication server via the data interaction between the intelligence remote controller and the television controller, and the authentication server determines whether the authentication is valid based on the operation result of the authentication code, thus ensuring the authentication algorithm is unreadable and the electronic authentication is secure.

DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments. Wherever possible, the same reference numbers are used throughout the drawings to refer to the same or like elements of an embodiment.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
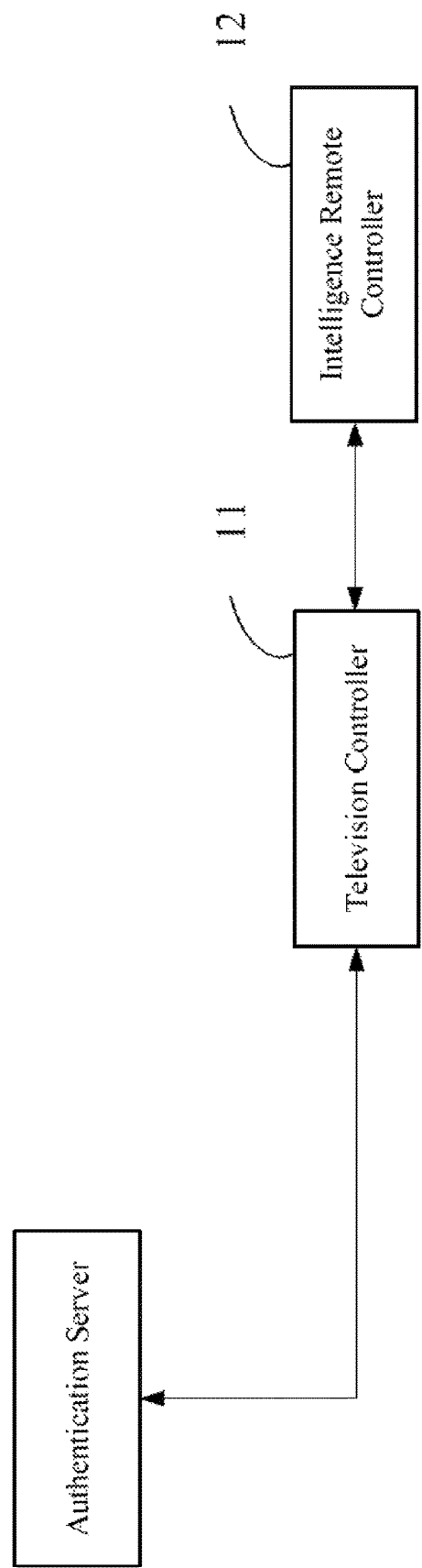
FIG. 1 is a schematic diagram illustrating a system for an electronic authentication client in accordance with certain embodiments of the present disclosure.

Reference is made to FIG. 1, which is a schematic diagram illustrating a system for an electronic authentication client in accordance with certain embodiments of the present disclosure.

In accordance with this disclosure, the system for the electronic authentication client may include a television controller 11 and an intelligence remote controller 12.

The television controller 11 may be configured to receive data of an authentication code from an authentication server 13, send the data of the authentication code to the intelligence remote controller 12, receive an operation result of an authentication code from the intelligence remote controller 12, and send the operation result of the authentication code to the authentication server 13.

The intelligence remote controller 12 may be configured to receive the data of the authentication code from the television controller 11, operate on the data of the authentication code based on a built-in authentication algorithm to obtain the operation result of the authentication code, and send the operation result of the authentication code to the television controller 11.

In certain embodiments, the television controller 11 may be an intelligent set-top box or an intelligent controller of other television equipment. The television controller 11 has an internet connection function for communicating with an authentication server 13 online. The television controller 11 may exchange data with the intelligence remote controller 12, receive data of an authentication code from the authentication server 13 and send the data to the intelligence remote controller 12. The television controller 11 also may receive the operation result of the authentication code from the intelligence remote controller 12 and send the result to the authentication server 13. The data of the authentication code is generated by the authentication server 13 based on a convention, suitable for the authentication algorithm built in the intelligence remote controller 12. The data of the authentication code may be a random number generated by the authentication server 13 based on an authentication request for instance, which improves the security of electronic certification.

A special authentication algorithm may be built in the intelligence remote controller 12, the computational logic of which is secret and may be recorded in machine code.

In order to ensure the security of the authentication algorithm, the algorithm may be designed into the hardware of the intelligence remote controller 12 by a programmable microprocessor, and the industry control for hardware reading will be cut off after the algorithm code has been programmed, so as to ensure the algorithm is unreadable and unwritable.

Figure 2:
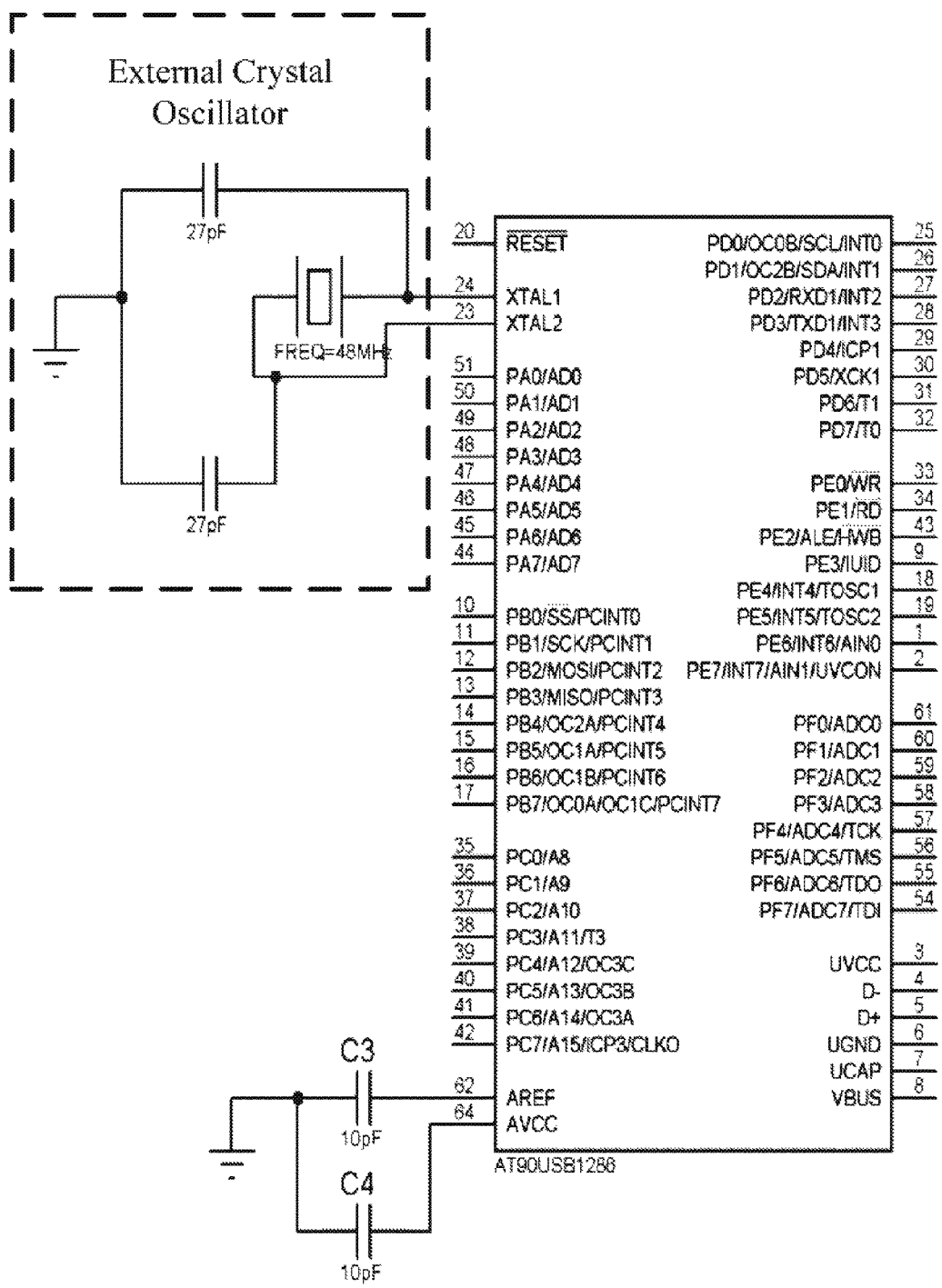
FIG. 2 is a schematic diagram illustrating a programmable microprocessor chip used in an exemplary embodiment of the system for the electronic authentication client.

A special programmable microprocessor chip may be built in the intelligence remote controller 12 for recording the authentication algorithm. Take a programmable microprocessor chip AT90USBKey for example, which is integrated with a SPI communication module, a 16 k Flash and a 4 k RAM. Its circuit design is shown in FIG. 2.

Beyond the chip itself, the system also needs an external crystal oscillator to provide a clock needed for communication. In the embodiment, a crystal oscillator with an oscillation frequency of 48M is used. In addition, only a few simple electrolytic capacitors are required to ensure the stability of the circuit.

The algorithm compiled may be programmed into the chip by a SPI interface of the chip, while the industry control of the Flash of the chip can be blown, in order to ensure that the chip is unreadable and unwritable after production and the chip is accessible only by the SPI interface for communication. The data of the authentication code is operated on by the authentication algorithm in the chip to obtain the operation result of the authentication code. Because the Flash in the chip cannot be read directly by removing the encapsulation of the chip in the prior art, it makes sure that the authentication algorithm is invisible to users, and the security of the whole authentication client system can be guaranteed.

The present disclosure does not limit the type of the programmable microprocessor and those of ordinary skill in the art can choose an appropriate programmable microprocessor.

The system for the electronic authentication client interacts with the data by using of an intelligence remote controller 12 and a television controller 11, such as a set-top box or the like, to implement electronic authentication, and it does not require set up of a data transmission interface, such as USB or the like, and does not require plug-in of a USB key, due to implementing the authentication algorithm in the intelligence remote controller, which provides convenience. The television controller 11 sends the data of the authentication code from the authentication server 13, the intelligence remote controller 12 operates on the data of the authentication code using a built-in unreadable authentication algorithm, and the operation result of the authentication code is sent to the authentication server 13 via the data interaction between the intelligence remote controller 12 and the television controller 11, thus ensuring the authentication algorithm is unreadable and the electronic authentication is secure.

The system for electronic authentication client may be constituted as a system for electronic authentication with an authentication server 13. The authentication server 13 is configured to send data of an authentication code based on an authentication request, receive an operation result of an authentication code, and determine whether the authentication is valid based on the operation result of the authentication code.

For example, the authentication server 13 operates on the data of the authentication code based on a corresponding authentication algorithm to obtain a second operation result of the authentication code, receives a first operation result of the authentication code from the television controller 11, and determines whether the authentication is valid based on the first operation result and the second operation result of the authentication code.

In certain embodiments, the authentication server 13 may be a server for electronic payment, or a server for other systems requiring authentication. The authentication server 13 may further return information of an authentication result after completing the authentication. The television controller 11 may further be used to receive the information of the authentication result from the authentication server 13 and send the information of the authentication result to the intelligence remote controller 12.

In one embodiment, the intelligence remote controller 12 sends an authentication request to the television controller 11. The television controller 11 sends the authentication request to the authentication server 13, and receives the data of authentication code sent from the authentication server 13 based on the authentication request.

That is, users may send authentication requests by the intelligence remote controller 12 of the present disclosure, with convenience. For example, when a user would like to confirm an electronic payment using the intelligence remote controller 12, the user may trigger the controlling keyboard of the intelligence remote controller 12 to send an authentication request.

In another embodiment, the television controller 11 may be further used to receive a private key for the client from the authentication server 13 and send the private key for the client to the intelligence remote controller 12. The intelligence remote controller 12 may be further used to receive and store the private key for the client, encrypt the data to be sent to the television controller 11 and decrypt the data from the television controller 11 based on the private key for the client, to improve the security of the information transmission during the process of authentication. The data of the private key for the client may be written into the memory chip of the intelligence remote controller 12.

When the user uses the intelligence remote controller 12 for the first time, the account name and password input by the user may be authenticated preliminarily. The intelligence remote controller 12 receives the input account name and password, and sends the account name and password to the authentication server 13 through the television controller 11. The authentication server 13 performs preliminary authentication based on the account name and password. On successful authentication, the authentication server 13 will pass a digital certificate containing a private key to the client that the client may encrypt and decrypt the data exchanged with the authentication server 13 by using of the private key, while the authentication server 13 encrypts the data to be sent to the client and decrypts the data received from the client based on a public key corresponding to the private key, to improve the confidentiality and security of the data interaction during the process of authentication.

Figure 3:
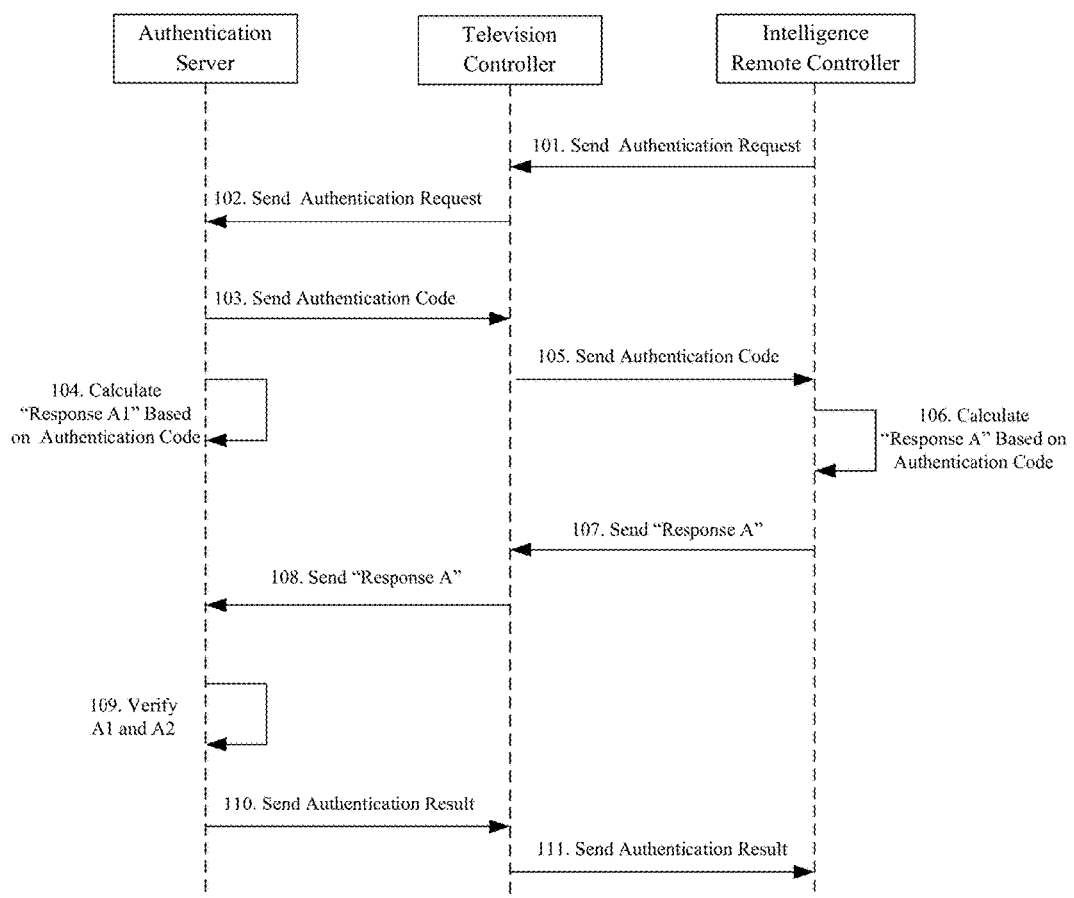
FIG. 3 is a flow diagram illustrating a process of electronic authentication executed by the system for electronic authentication in accordance with one embodiment of the present disclosure.

Reference is now made to FIG. 3, which is a flow diagram illustrating a process of electronic authentication executed by the system for electronic authentication in accordance with one embodiment of the present disclosure.

At step 101, the intelligence remote controller sends an authentication request depending on the actions taken by the user, where data transmission is realized by a special wireless communication channel between the intelligence remote controller and the television controller, the data sent by the intelligence remote controller is encrypted by a private key for the client and the corresponding received data is decrypted by the private key for the client, so as to ensure the confidentiality and security of the data interaction.

At step 102, the television controller receives the authentication request and sends the authentication request to the authentication server, where data transmission is realized by 128-bit TSL transmission encryption between the television controller and the authentication server, to guarantee the security of communication.

At step 103, the authentication server passes data of an authentication code to the television controller, where the data of the authentication code is a random number generated by the authentication server based on the authentication request. The authentication server receives the authentication request sent by the television controller, automatically generates the random number based on a convention, and passes the random number to the television controller. The authentication server decrypts the received data from the television controller using a corresponding public key, and encrypts the data to be sent to the television controller using the public key.

At step 104, the authentication server calculates an operation result of the authentication code referred as "response A1", based on the data of the authentication code and an internal authentication algorithm.

At step 105, the television controller receives the data of the authentication code, and sends the data to the intelligence remote controller.

At step 106, the intelligence remote controller calculates an operation result of the authentication code referred as "response A", based on the data of the authentication code and a built-in authentication algorithm, wherein the built-in authentication algorithm is designed into the hardware of the intelligence remote controller and is unreadable and unwritable to prevent the divulgence of the algorithm.

At step 107, the intelligence remote controller sends the "response A" to the television controller.

At step 108, the television controller receives the "response A" and sends the "response A" to the authentication server.

At step 109, the authentication server receives the "response A", and verifies the "response A" with "response A1" for authentication.

At step 110, the authentication server passes a result of the authentication to the television controller, wherein the result of the authentication is "authentication succeeded" or "authentication failed" in general.

At step 111, the television controller receives the result of the authentication, and sends the result of the authentication to the intelligence remote controller, to provide the user with the result of the authentication.

In accordance with this disclosure, the system for electronic authentication interacts with the data by using of an intelligence remote controller and a television controller to implement electronic authentication, and it does not require set up of a data transmission interface, such as USB or the like, and does not require plug-in of a USB key, due to implementing the authentication algorithm in the intelligence remote controller, which provides convenience.

Figure 4:
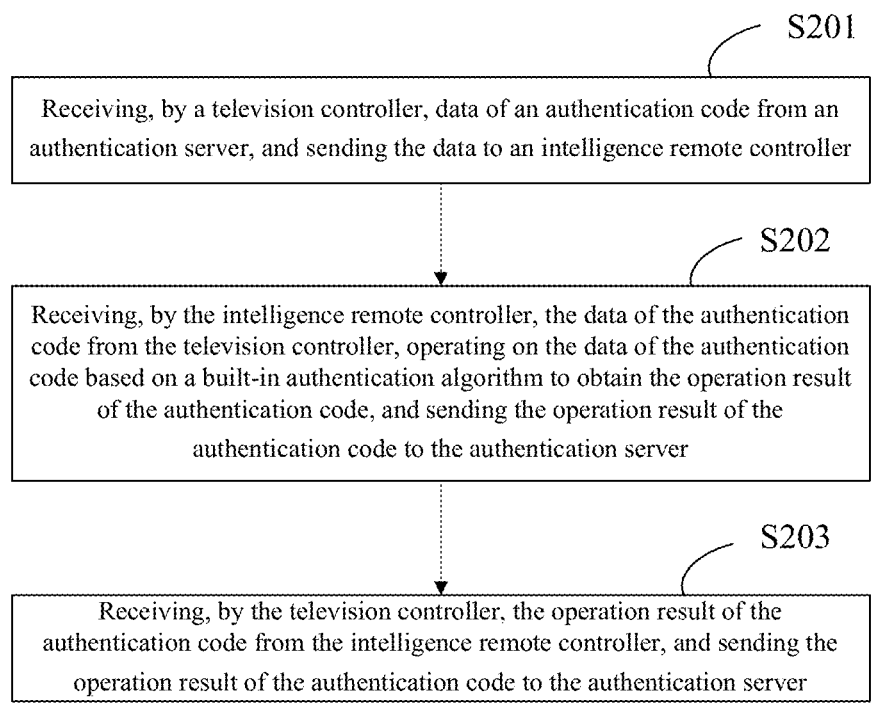
FIG. 4 is a flow diagram illustrating a method for the electronic authentication client in accordance with certain embodiments of the present disclosure.

Reference is now made to FIG. 4, which is a flow diagram illustrating a method for an electronic authentication client in accordance with certain embodiments of the present disclosure.

The processing method for the electronic authentication client includes:

S201, receiving, by a television controller, data of an authentication code from an authentication server, and sending the data to an intelligence remote controller;

In certain embodiments, the television controller may be an intelligent set-top box or an intelligent controller of other television equipment. The intelligence remote controller preferably communicates with the television controller by a special wireless transmission channel.

The television controller has an internet connection function for communicating with an authentication server online. The television controller may exchange data with the intelligence remote controller, receive data of an authentication code from the authentication server and send the data to the intelligence remote controller. The data of the authentication code is generated by the authentication server based on a convention, suitable for the authentication algorithm built in the intelligence remote controller. The data of the authentication code may be a random number generated by the authentication server based on an authentication request for instance, which improves the security of electronic certification.

In the embodiment, the intelligence remote controller sends an authentication request to the television controller; and the television controller sends the authentication request to the authentication server, and receives the data of the authentication code sent by the authentication server based on the authentication request.

That is, users may send authentication requests via the intelligence remote controller of the present disclosure, with convenience. For example, when a user would like to confirm an electronic payment using the intelligence remote controller, the user may trigger a controlling keyboard of the intelligence remote controller to send an authentication request.

S202, receiving, by the intelligence remote controller, the data of the authentication code from the television controller, operating on the data of the authentication code based on a built-in authentication algorithm to obtain the operation result of the authentication code, and sending the operation result of the authentication code to the authentication server; and The computational logic of the authentication algorithm built in the intelligence remote controller is secret and may be recorded in machine code. In order to ensure the security of the authentication algorithm, the algorithm may be designed into the hardware of the intelligence remote controller by a programmable microprocessor, and the industry control for hardware reading will be cut off after the algorithm code has been programmed, so as to ensure the algorithm is unreadable and unwritable.

S203, receiving, by the television controller, the operation result of the authentication code from the intelligence remote controller, and sending the operation result of the authentication code to the authentication server.

The above process is the processing method for the electronic authentication client performed on the client. The processing method for the electronic authentication client of the present disclosure interacts with the data by using of an intelligence remote controller and a television controller, such as a set-top box or the like, to implement electronic authentication, and it does not require set up of a data transmission interface, such as USB or the like, and does not require plug-in of a USB key, due to implementing the authentication algorithm in the intelligence remote controller, which provides convenience. The television controller sends the data of the authentication code from the authentication server, the intelligence remote controller operates on the data of the authentication code using a built-in unreadable authentication algorithm, and the operation result of the authentication code is sent to the authentication server via the data interaction between the intelligence remote controller and the television controller, thus ensuring the authentication algorithm is unreadable and the electronic authentication is secure.

In the method for electronic authentication, the electronic authentication server generates the data of the authentication code based on the authentication request, and passes the data of the authentication code to the television controller, on the server side. In addition, the electronic authentication server receives the operation result of the authentication code sent from the television controller, and determines whether the authentication is valid based on the operation result of the authentication code.

For example, the authentication server operates on the data of the authentication code based on a corresponding authentication algorithm to obtain a second operation result of the authentication code, receives a first operation result of the authentication code from the television controller, determines whether the authentication is valid based on the first operation result and the second operation result of the authentication code, and obtains a result of the authentication. Then the authentication server sends the result of the authentication to the television controller.

In certain embodiments, the authentication server may be a server for electronic payment, or a server for other systems requiring authentication.

In a preferable embodiment, the television controller may further be used to receive the information of the authentication result from the authentication server and send the information of the authentication result to the intelligence remote controller.

The authentication server will pass the result of the authentication to the television controller after the validity of the authentication has been determined. The television controller sends the result of the authentication to the intelligence remote controller to provide the user with the result of the authentication via the intelligence remote controller.

In another preferable embodiment, the method may further include the following steps:

receiving, by the television controller, a private key for a client from the authentication server, and sending the private key for the client to the intelligence remote controller; and receiving and storing, by the intelligence remote controller, the private key for the client, and encrypting the data to be sent to the television controller and decrypting the data from the television controller based on the private key for the client.

When the user uses the intelligence remote controller for the first time, the account name and password input by the user may be authenticated preliminarily. The intelligence remote controller receives the input account name and password, and sends the account name and password to the authentication server through the television controller. The authentication server performs preliminary authentication based on the account name and password. On successful authentication, the authentication server will pass a digital certificate containing a private key to the client that the client may encrypt and decrypt the data exchanged with the authentication server by using the private key, while the authentication server encrypts the data to be sent to the client and decrypts the data received from the client based on a public key corresponding to the private key, to improve the confidentiality and security of the data interaction during the process of authentication.

The embodiments are chosen and described in order to explain the principles of the disclosure and their practical application so as to activate those skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for authenticating a user without requiring a plug-in interface for authentication data transmission, comprising:

a television controller which is an intelligent set-top box of a television equipment, an intelligence remote controller including a programmable microprocessor chip, and an authentication server, each adapted to transmit and receive data, wherein:

the intelligence remote controller is adapted to receive an authentication code from the television controller, calculate a first operation result based on the authentication code, and transmit the first operation result of the authentication code to the television controller;

the television controller is adapted to receive the authentication code from the authentication server, transmit the authentication code to the intelligence remote controller, and transmit the first operation result received from the intelligence remote controller to the authentication server; and the authentication server is adapted to generate and transmit the authentication code to the television controller, calculate a second operation result based on the authentication code, receive the first operation result from the television controller, and verify the first operation result with the second operation result for authentication;

wherein, the first operation result includes the data calculated by the intelligence remote controller using a built-in authentication algorithm on the authentication code generated by the authentication server;

the built-in authentication algorithm on the intelligence remote controller is unreadable and unwritable;

during an initial setup of the intelligence remote controller, after the built-in authentication algorithm is programmed into the programmable microprocessor chip, an industry control of a flash of the programmable microprocessor chip is disabled; and the programmable microprocessor chip is accessible only by a communication interface.

2. The system of claim 1, wherein
the television controller is further adapted to receive a private key from the authentication server and send the private key to the intelligence remote controller; and
the intelligence remote controller is further adapted to receive and store the private key, encrypt the data to be sent to the television controller and decrypt the data from the television controller based on the private key.

3. The system of claim 1, wherein the intelligence remote controller is adapted to communicate with the television controller using a wireless transmission channel.

4. The system of claim 1, wherein:
the intelligence remote controller is further adapted to send an authentication request to the television controller in response to a user input on the intelligence remote controller;
the television controller is further adapted to transmit the authentication request to the authentication server; and
the authentication code is generated by the authentication server in response to the authentication request.

5. A method for authenticating a user without requiring a plug-in interface for authentication data transmission, comprising:
receiving, by an intelligence remote controller including a programmable microprocessor chip, an authentication code from a television controller, wherein the authentication code is generated by an authentication server and transmitted to the television controller, and the television controller is an intelligent set-top box of a television equipment, the intelligence remote controller, the television controller, and the authentication server each adapted to transmit and receive data;
calculating, by the intelligence remote controller, a first operation result based on the authentication code; and
transmitting, by the intelligence remote controller, the first operation result of the authentication code to the television controller, wherein the television controller transmits the first operation result to the authentication server; the authentication server calculates a second operation result based on the authentication code, and the authentication server verifies the first operation result with the second operation result for authentication,
wherein
the first operation result includes the data calculated by the intelligence remote controller using a built-in authentication algorithm on the authentication code generated by the authentication server;
the built-in authentication algorithm on the intelligence remote controller is unreadable and unwritable;
during an initial setup of the intelligence remote controller, after the built-in authentication algorithm is programmed into the programmable microprocessor chip, an industry control of a flash of the programmable microprocessor chip is disabled; and
the programmable microprocessor chip is accessible only by a communication interface.

6. The method of claim 5, further comprising:
sending, by the intelligence remote controller to the television controller, an authentication request in response to a user input on the intelligence remote controller; and
transmitting, by the television controller, the authentication request to an authentication server;
wherein the authentication code is generated by the authentication server in response to the authentication request.

7. A method for authenticating a user without requiring a plug-in interface for authentication data transmission, comprising:
sending, by an intelligence remote controller to a television controller, an authentication request based on manual user input, wherein the intelligence remote controller includes a programmable microprocessor chip, and the television controller is an intelligent set-top box of a television equipment, the intelligence remote controller, the television controller, and the authentication server each adapted to transmit and receive data;
receiving, by the television controller, the authentication request;
transmitting, by the television controller, the authentication request to an authentication server;
obtaining, by the authentication server, an operation result based on the authentication request;
determining, by the authentication server, an authentication result about whether the user is authentic based on the operation result; and
sending, by the authentication server, the authentication result to the television controller;
wherein the method further comprises:
receiving, by the television controller, a private key from the authentication server;
sending, by the television controller, the private key to the intelligence remote controller;
receiving, by the intelligence remote controller, the private key; and
encrypting data to be sent to the television controller and decrypting the data from the television controller based on the private key,
wherein,
the operation result includes the data calculated by the intelligence remote controller using a built-in authentication algorithm on the authentication code generated by the authentication server;
the built-in authentication algorithm on the intelligence remote controller is unreadable and unwritable;
during an initial setup of the intelligence remote controller, after the built-in authentication algorithm is programmed into the programmable microprocessor chip, an industry control of a flash of the programmable microprocessor chip is disabled; and
the programmable microprocessor chip is accessible only by a communication interface.

8. The method of claim 7, further comprising:
generating, by the authentication server, an authentication code in response to the authentication request;
transmitting, by the authentication server, the authentication code to the television controller;
transmitting, by the television controller, the authentication code to the intelligence remote controller;
calculating, by the intelligence remote controller, the operation result based on the authentication code;
transmitting, by the intelligence remote controller, the operation result of the authentication code to the television controller; and
transmitting, by the television controller, the operation result of the authentication code to the authentication server for authentication.

9. The method of claim 7, wherein the intelligence remote controller communicates with the television controller using a wireless transmission channel.

* * * * *

UNITED STATES PATENT AND TRADEMARK OFFICE
CERTIFICATE OF CORRECTION

PATENT NO. : 9,998,440 B2  
APPLICATION NO. : 14/484644  
DATED : June 12, 2018  
INVENTOR(S) : Yan et al.

Page 1 of 1

It is certified that error appears in the above-identified patent and that said Letters Patent is hereby corrected as shown below:

On the Title Page

Item (72), after "Yu" and before ", Guangdong" change "Yan" to --Yin--.

Signed and Sealed this  
Twenty-fifth Day of June, 2019

Andrei Iancu  
*Director of the United States Patent and Trademark Office*